US005823519A

United States Patent [19]

Tunkers

[11] Patent Number: 5,823,519

[45] Date of Patent: Oct. 20, 1998

[54] TOGGLE LEVER CLAMP

[75] Inventor: Josef-Gerhard Tunkers, Ratingen, Germany

[73] Assignee: Tünkers Maschinenbau GmbH, Ratingen, Germany

[21] Appl. No.: 734,640

[22] Filed: Oct. 21, 1996

[30] Foreign Application Priority Data

Oct. 19, 1995 [DE] Germany ........................ 295 16 531 U

[51] Int. Cl.[6] ........................................................ B23Q 3/08

[52] U.S. Cl. ................................. 269/29; 269/24; 269/32; 269/228; 269/201

[58] Field of Search ................................. 269/32, 29, 24, 269/25, 27, 35, 228, 201, 239

[56] References Cited

U.S. PATENT DOCUMENTS

| | | | |
|---|---|---|---|
| 2,683,386 | 7/1954 | Doebeli . | |
| 2,914,977 | 12/1959 | Verderber | 269/35 |
| 3,116,058 | 12/1963 | Blatt . | |
| 3,371,923 | 3/1968 | Blatt . | |
| 3,482,830 | 12/1969 | Sendoykas . | |
| 3,545,050 | 12/1970 | Blatt . | |
| 3,599,957 | 8/1971 | Blatt | 269/32 |
| 3,801,091 | 4/1974 | McPherson et al. | 269/228 |
| 3,872,760 | 3/1975 | Desnoyers, Jr. | 269/228 |
| 4,257,583 | 3/1981 | Carson | 269/32 |
| 4,445,676 | 5/1984 | Tunkers | 269/32 |
| 4,458,889 | 7/1984 | McPherson et al. . | |
| 4,620,696 | 11/1986 | Blatt | 269/32 |
| 4,637,597 | 1/1987 | McPherson et al. | 269/32 |
| 4,854,564 | 8/1989 | McPherson et al. | 369/32 |
| 4,887,803 | 12/1989 | Witt | 269/32 |

FOREIGN PATENT DOCUMENTS

| | | |
|---|---|---|
| 1 405 779 | 5/1965 | France . |
| 1 477 602 | 4/1967 | France . |
| 30 739 | 6/1965 | German Dem. Rep. . |
| 156 107 | 11/1904 | Germany . |
| 550 737 | 5/1932 | Germany . |
| 708 439 | 7/1941 | Germany . |
| 10 16 128 | 3/1958 | Germany . |
| 1 171 350 | 5/1964 | Germany . |
| 11 76 969 | 5/1965 | Germany . |
| 19 17 295 | 6/1965 | Germany . |
| 12 68 074 | 11/1968 | Germany . |
| 19 50 721 | 3/1972 | Germany . |
| 21 29 750 | 10/1973 | Germany . |
| 22 22 686 | 11/1973 | Germany . |
| 28 13 694 | 10/1979 | Germany . |
| 29 04 378 | 4/1983 | Germany . |
| 83 07 606 | 8/1983 | Germany . |
| 35 13 680 | 2/1987 | Germany . |
| 36 13 852 | 10/1987 | Germany . |
| 814 938 | 6/1959 | United Kingdom . |
| 1 221 037 | 3/1971 | United Kingdom . |
| 2 191 428 | 12/1987 | United Kingdom . |

*Primary Examiner*—James G. Smith
*Assistant Examiner*—Lee Wilson
*Attorney, Agent, or Firm*—Antonelli, Terry, Stout & Kraus, LLP

[57] ABSTRACT

A toggle lever clamp for use in devices and welding machines in the motor vehicle industry, has a clamping head consists of two shell-shaped parts that combine to form a housing. This arrangement reduces the number of individual parts to a considerable degree and protects sensitive parts on all sides against dust, dirt, and water spray, as well as welding spatter, while permitting ease of movement of the clamps.

19 Claims, 2 Drawing Sheets

TOGGLE LEVER CLAMP

FIELD OF INVENTION

The invention relates to a toggle lever clamp, especially for use in devices and welding machinery for auto body construction in the motor vehicle industry.

BACKGROUND OF THE INVENTION

Toggle lever clamps are used in particular for a variety of applications in auto body construction in the motor vehicle industry. For example, toggle lever clamps with manual adjustment devices are used in welding devices to insert additional parts by hand and to pretension them manually in automatically operating controlled toggle lever clamps. After the parts to be clamped have been secured by the manually operated toggle lever clamps, all of the toggle lever clamps including the automatic ones are closed by charging them with a pressure medium, especially with compressed air.

Known toggle lever clamps have a manual lever connected to the toggle lever joint and thus forcibly participating in the closing and opening movements of the toggle lever clamp and consequently posing a risk to operating personnel. When these toggle lever clamps are pretensioned by the manual adjusting device and then all the toggle lever clamps are charged with pressure medium, especially compressed air, this causes the manual lever to fly back, which can result in serious injuries to operating personnel.

This disadvantage is overcome by the known toggle lever clamp described in DE 35 13 680 for clamping workpieces with an adjusting device that engages the piston rod of a double-acting clamping cylinder, said device being manually operable and provided with a manual lever. In this known toggle lever clamp, the manual lever, made with two arms and provided with a handle, is mounted with a pivot axis on the piston rod of the clamping cylinder so that the lever arm facing away from the handle is connected through a pivot joint with a clamping part and the lever arm facing the handle is connected by a pivot joint as well as a coupling member with articulation, with a sliding block guided in a connecting link. In the piston-rod-side end wall of the clamping cylinder, a 3/2-way valve of the non-return valve is provided that monitors the return stroke travel of the clamping cylinder, the vent position of said non-return valve for the return stroke travel being adjustable by the slider, using a vent line monitored by this valve and leading to the open, and whose blocking position for this vent line is produced by the clamping piston which is in a dragging connection with the piston rod during its lengthwise movement independently of the piston rod, with the return stroke travel with a 5/2-way valve-switching valve for the clamping cylinder being connectable in this blocking position by the other two paths in this non-return valve.

The shut-off valve is designed as a piston slide slidable between two stops in its lengthwise direction or as a valve that can be opened and closed.

The toggle lever clamp is thus associated with a shut-off device that can be brought alternately into the vent position by the manual adjusting device to vent the cylinder chamber (annular chamber) traversed by the piston rod and can be brought into a blocking position by the piston itself when the other cylinder chamber opposite the annular chamber is charged with full pressure-medium pressure (especially compressed air) during automatic clamping. This is accomplished in such fashion that a toggle lever clamp, without any external structural modifications, has associated with it a shut-off slide or a valve that, by manual actuation, vents the annular side of the toggle lever clamp and simultaneously shuts off the supply of pressure medium to the annular side.

A toggle lever clamp operable by pressure medium is already known from DE 36 13 852, said clamp serving to clamp workpieces, especially for use in devices and welding machines for auto body construction in the motor vehicle industry, with a manually operable two-armed manual lever engaging the piston rod of a double-acting clamp cylinder, with a handle associated with said manual lever. The two-armed manual lever is mounted on the piston rod by a pivot axis. The lever arm of the two-armed manual lever facing away from the handle is connected by a rotary joint with a clamping part. A non-return valve designed as a multi-path valve is located in the end wall of the clamping cylinder on the piston-rod end, said valve monitoring the return stroke travel of the clamping cylinder, with the vent position for the return stroke travel being controllable by a vent line leading into the open and monitored by this non-return valve, controllable by an adjusting part associated with the end of the two-armed manual lever on the manual lever side. The blocking position of the non-return valve for the vent line is created by the clamping piston which is in a dragging connection with the piston rod during its lengthwise movement independently of the piston rod, with a clamping tab associated with the toggle lever joint also being provided that is connected on one side by a pivot axis with a clamping part and on the other side with a piston rod through another pivot axis running parallel thereto. The two-armed manual lever is likewise located on the same pivotably movable pivot axis that connects the clamping tab with the piston rod. The handle also has a lever that is mounted on the two-armed manual lever by a pivot axis running parallel to the articulation axes of the toggle lever joint so that it is pivotably movable, said lever being pivotably movable between at least two stops provided, possibly indirectly, on the two-armed manual lever. The lever arm of the two-armed manual lever facing away from the manual lever forms the adjusting part. As a result, it is possible to close and open the toggle lever mechanism manually. In the same way, the position of manually pretensioned parts can also be corrected.

DE 83 07 606 U1 teaches a device with a manual lever for performing an adjusting and clamping movement; there is however no mention of a simpler design for the switching element (5/3-way valve) for a clamping device that comprises a plurality of toggle lever clamps and means which, during automatic clamping, prevent dangerous forward and backward movement of the manual lever.

DE-PS 156 107 does not teach a toggle lever clamp, but a hydraulic press. There is a two-armed manual lever for controlling a pressure medium cylinder, but since this manual lever is pivotably mounted on the piston rod and on the press stand and the pistons with the piston rod are in a dragging connection with the working cylinder, the manual lever is also necessarily pivoted during the adjusting movement of the working cylinder.

DE 29 04 378 describes only a clamping piston that is in a dragging connection with a piston rod. However, this piston serves, in one stop position, to permit guidance of the workpiece through the gripping jaws actuated by the piston and then, by means of a second working piston (clamping piston), to grip the workpiece with the grippers without the first piston being able to block the movement of the piston rod.

The press control according to DE-AS 10 16 128 likewise does not teach a device for pivoting a manual lever in toggle lever clamps because in that AS, the manual lever is located such that is can be mounted on and removed from a device for changing the press stroke.

Finally, GB-PS 814 938 teaches a device for mounting a snap ring in a radial shaft or bolt groove. This device is provided with a manual lever that serves as an actuating lever for the control valve. When this lever is actuated, a counterbearing part enters this groove to align the device for radial guidance, while at the same time the plunger is entrained to remove a snap ring from a magazine and to mount it on the annular groove.

German Utility Model Application 295 04 267.2 relates to a toggle lever clamp especially for use in auto body construction in the motor vehicle industry, with a clamping head and a cylinder abutting it as an axial extension thereof, in which a piston, alternately chargeable on either side by the pressure of a pressure medium, preferably compressed air, is guided in a lengthwise displaceable and sealing fashion, said piston traversing, with its piston rod, the cylinder and a clamping head abutting the latter in the axial direction, with a toggle lever arrangement being mounted at the free end of the piston rod inside the housing, said arrangement having a clamping arm associated therewith, possibly with limit switches or position sensors, with a clamping head consisting only of two housing parts that are shell-shaped and integral material-wise, said parts encapsulating the toggle lever arrangement and a part of the piston rod to protect them against dust, dirt, and spray from the exterior, with guide grooves being provided in the inner walls of the housing parts for the toggle lever arrangement and with through bores provided for a pivot pin of the toggle lever arrangement and possibly an opening for a housing for microswitches or inductive switches or for pneumatic switches. The parting plane runs parallel to the lengthwise axis in the direction of the piston rod. The clamping arm is bolted to a fork arm, with said fork arm being mounted on the profiled pivot pin of the toggle lever arrangement in such fashion that the fork arm surrounds the shell-shaped housing part externally and is mounted releasably by a mounting tab on the ends of the pivot pin. Then an arrangement can be made such that the fork arm has an integral bolting part that is located centrally or eccentrically, depending on the installation conditions, on the fork arm, with the clamping arm being attached to the screwing part by screwing or the like.

DE 22 22 686.4-15 teaches a pressure-medium-actuatable toggle lever clamp for auto body parts, consisting of a housing with a cylinder chamber for the piston, with guide means provided at the free piston rod end for the piston rod and a piston rod pin connected by a tab with the knee joint of a workpiece-clamping angle lever pivotably mounted on a bearing pin mounted in the housing. Guide means for the piston rod consist of rollers provided at the ends of the piston rod pin, said rollers being guideable in guide grooves or lengthwise slots in a seal-free movement area, said grooves running in the axial direction of the piston rod, said area being capable of being provided in the housing on the side with the free piston rod end independently of the cross section of the piston rod. In another design, the guide means for the piston rod consist of rollers provided at the ends of the piston rod pin located directly at the ends of the piston rod, said rollers being guideable in guide grooves or lengthwise slots running in the axial direction of the piston rod, in a movement space free of seals, said space being capable of being provided in the housing on the side with the free piston rod end independently of the cross section of the piston rod.

SUMMARY OF THE INVENTION

The goal of the invention is to provide a toggle lever clamp, especially for use in devices and welding machines for auto body construction in the motor vehicle industry, said clamp being both manually adjustable and capable of being energized by the pressure of a pressure medium and having sturdy problem-free kinematics to transmit the forces from the manual levers to the toggle joint, said clamp also being largely encapsulated to protect against dirt, dust, and liquid spray.

The goal is achieved by a toggle lever clamp comprising a clamping head and a cylinder abutting said head as an axial extension thereof, in which cylinder a piston, alternately pressurized on either side by the pressure of a pressure fluid medium is guided displaceably lengthwise and in a sealing manner, said piston traversing with its piston rod, cylinder and a clamping head abutting said cylinder in the axial direction, a toggle joint arrangement being mounted at the free end of piston rod inside the housing, said arrangement having a clamping arm associated therewith, with a manual lever that is manually operable and engages piston rod, a handle associated with said manual lever, the manual lever cooperating with piston rod through a joint for its axial movement, the clamping head consisting of two housing parts that are shell-shaped and integral material-wise, said parts encapsulating the toggle lever arrangement and a portion of piston rod to protect them from dust, dirt, and spray entering from the outside, wherein guide grooves for toggle lever arrangements and through bores for a pivot pin of the toggle lever arrangement and optionally at least one opening or recess for a housing for microswitches or for inductive switches or for pneumatic switches are provided in inner walls of shell-shaped housing parts, and the manual lever is mounted on a pivot axis associated with clamping head, and a pivot axis is connected by an articulated lever with a driver, said driver being guided and held directly in a connecting link of piston rod.

In the invention, the connection between the manual lever and the piston rod consists of an articulated lever connected with a rigid driver that is guided and retained directly in a connecting link guide of the piston rod. As a result, the number of individual parts is reduced and a high degree of functional reliability is achieved. In addition, the housing of the clamping head consists of only two shell-shaped parts that combine to form the housing. As a result, the number of individual parts is further reduced. In addition, these housing parts are so designed that the articulated lever and the rigid driver and their direct guidance by the connecting link in the piston rod itself are protected on all sides against dust and dirt, chips for example, but also against water spray and welding spatter. The latter can occur in particular when welding sheet metal in the automobile industry since these sheets are often coated.

Ease of operation of the device is achieved by virtue of the fact that the housing parts and/or housing shells have on their interiors all necessary grooves or depressions for guiding the toggle lever arrangement and mounting it. For example, the articulated pin of the toggle lever arrangement can be guided by rollers in internal guide grooves that are arranged both parallel to and in the lengthwise direction of the piston rod.

In addition, the two housing parts also have bearing openings for the pivot pins of the clamping head and possibly sealed openings for the pivot axis of the manual lever, which can be located in the space between the pivot pin of the clamping arm and the cylinder that receives the piston.

Further inventive and highly advantageous embodiments are described in the claims 2 to 16 attached to the specification.

In one embodiment according to claim 2, the rigid connecting link for the driver runs transversely to the lengthwise axis of the piston rod itself. The result is a compact design.

It is especially advantageous when, according to claim 3, the connecting link is located rectilinearly and orthogonally with respect to the lengthwise axis of the piston rod.

In another embodiment according to claim 4, the rigid driver is guided in the connecting link of the piston rod only so that it can be moved slidably and pivotably or can be rolled.

An especially advantageous embodiment is described in claim 5. This results in considerable ease of operation with limited play and sturdy permanent transmission of force.

Claim 6 explains another alternative design. This also applies to claim 7.

One preferred embodiment is described in claim 8. This permits an especially low-play, readily operating coupling.

Another preferred embodiment is described in claim 9.

The number of parts that cannot be lost is further reduced by an embodiment according to claim 10.

An embodiment according to claim 11 also contributes to a compact design.

This also applies to an embodiment according to claim 12.

An especially advantageous embodiment is described in claim 13.

Advantageously, the articulated lever is made approximately S-shaped in the side view according to claim 14.

An especially safe and compact guidance of the articulated lever is provided by an embodiment according to claim 15.

In the embodiment according to claim 16, at least one roller is provided at each end of the pivot pin of the toggle lever arrangement, said roller being rollably guided in one of the guide grooves of the shell-shaped housing part. As a result, these rollers are also optimally protected from the exterior. The guide grooves are made integral with the shell-shaped housing parts and consequently do not constitute loose parts that can be lost. These guide grooves cannot be seen from the outside and therefore do not project either, so that the clamping head has an especially compact design.

BRIEF DESCRIPTION OF THE DRAWINGS

The accompanying drawings show partially schematic views of an embodiment of the invention, wherein.

DETAILED DESCRIPTION OF THE INVENTION

Figure 1:
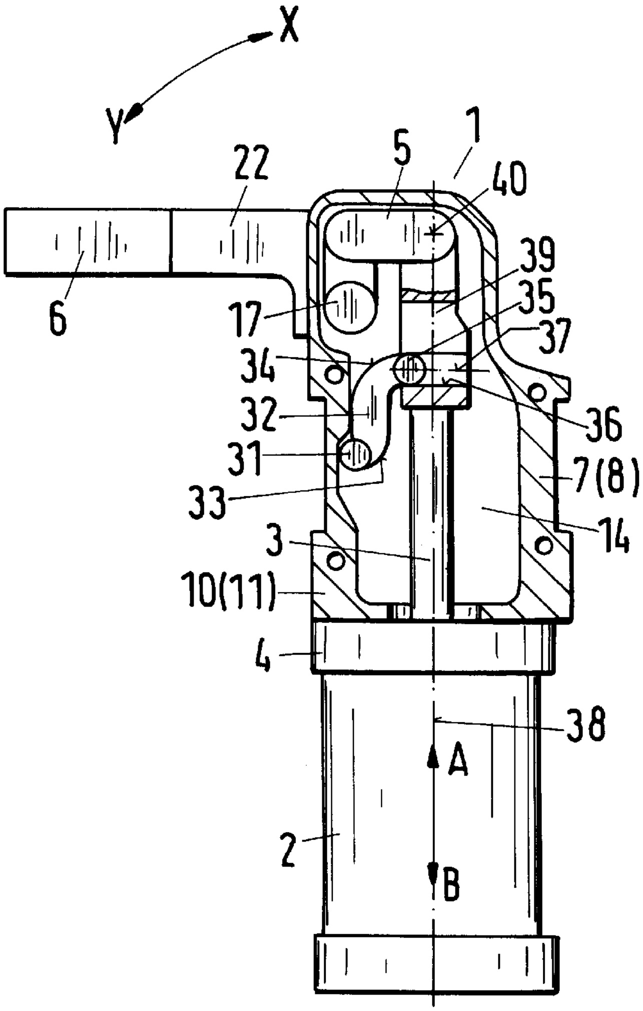
FIG. 1 is a toggle lever clamp, shown partially in a side view and partially in a lengthwise section.

Reference numeral 1 refers to a clamping head abutted axially by a cylinder 2 in which a piston, not shown, is mounted displaceably lengthwise and in a sealing fashion. Cylinder 2 is made in the form of a flat oval in the embodiment shown, so that the piston is correspondingly designed. A piston rod 3 is connected with the piston, said rod traversing cylinder 2 and clamping head 1 partially axially. Piston rod 3 also passes through a lid 4 in which it is guided in a sealed manner by a seal not shown.

In addition, FIG. 1 in particular shows that piston rod 3 is connected at its end with a toggle lever arrangement 5 with which a clamping arm 6 is associated. This clamping arm 6 is pivotably movable in directions X and Y depending on the charging of the piston with compressed air. The opening angle of this clamping arm can be variable, a maximum of 135° for example.

Figure 2:
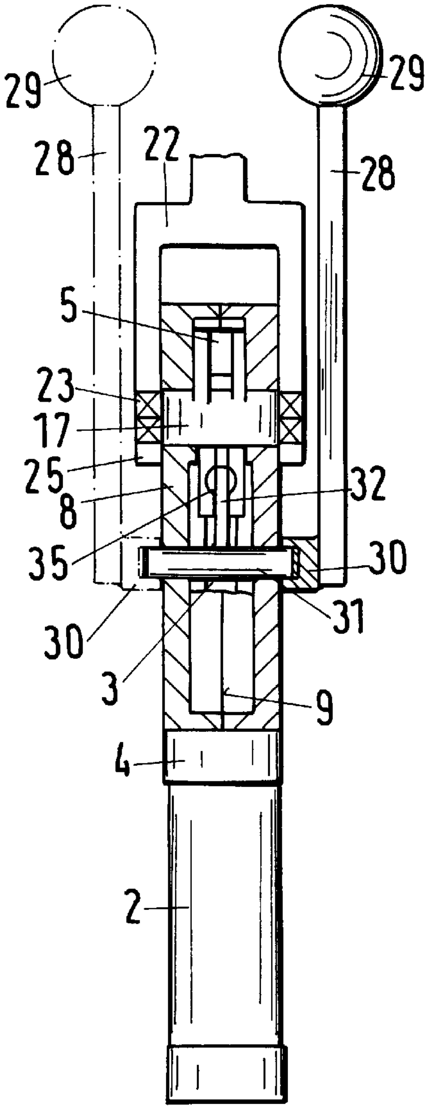
FIG. 2 is an end view of FIG. 1, partially in section, with manual levers that can be mounted alternatively as indicated by the dot-dashed lines.
Figure 3:
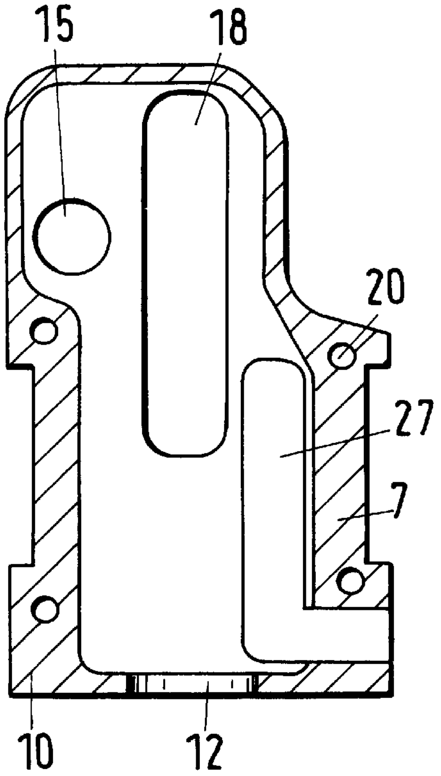
FIG. 3 shows a housing part in a top view looking at the parting plane.
Figure 4:
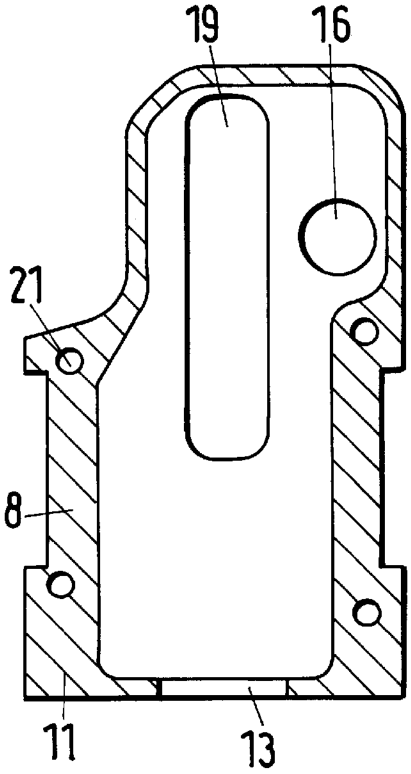
FIG. 4 is an top view according to FIG. 3 of the other housing part.

As shown particularly in FIG. 2, clamping head 1 has a housing composed of two shell-shaped housing parts 7 and 8 that fit close together sandwich-wise. Housing parts 7 and 8 are separated from one another by a parting plane 9 that runs in a straight line so that housing parts 7 and 8 rest flush against one another by walls 10 and 11 and are releasably and tightly connected together by screws (not shown).

Shell-shaped housing parts 7 and 8 are designed to be enclosed on all sides and have only one semicircular cutout 12 or 13 on one side, said cutout being associated with a bore through which piston rod 3 penetrates a chamber 14 delimited by housing parts 7 and 8. Toggle lever arrangement 5 is also located in this chamber 14. The end of piston rod 3 located inside chamber 14 and toggle lever arrangement 5 are therefore encapsulated from the outside to keep out dirt, dust, and liquid spray.

The two shell-shaped housing parts 7 and 8 each have bores 15 and 16 traversing them orthogonally, through which bores a pivot pin 17 passes for toggle lever arrangement 5.

In addition, the two shell-shaped housing parts 7 and 8 each have a guide groove 18 and 19. Guide grooves 18 and 19 are made the same and match one another in the assembled state of housing parts 7 and 8 in such fashion that toggle lever arrangement 5 with its associated components is guided in the direction of the lengthwise axis. For this purpose, rollers can be used for example that are provided at each end in a pivot pin that is not shown in detail. Only center line 40 of these pivot pins is shown in the drawing. At each end of pivot pin 2, one of these guide rollers can be provided that is guided in one of guide grooves 18 or 19. The rollers can be of the same size and can be arranged coaxially with respect to one another so that they are easy to operate when the toggle lever arrangement is pivoted and the latter is reliably guided.

Reference numerals 20 and 21 refer to bores. These bores, 20 for example, can be designed as through bores, while bores 21 associated coaxially therewith in the other housing part 8 are blind holes with threads. By screwing in threaded bolts, not shown, housing parts 7 and 8 can consist of steel or aluminum or another suitable material, in other words for example, an injected-molded material.

Walls 10 and 11 are finished to a high degree, polished or cast or injection molded for example, with surfaces to enable them to fit together tightly and without any gaps in order to achieve the necessary tightness to keep out dust and water spray.

Reference numeral 22 refers to a fork arm that has on its ends end sections 23 and 24 that are in the shape of squares or polygons in cross section. Numerals 25 and 26 refer to retaining tabs that fit against the fork-shaped end of the associated fork arm 22 and whose recesses of suitable shape fit over end sections 23 or 24 of pivot pin 17 and are connected with fork arm 22 in question by screws (not shown).

Fork arm 22 can have a screw-on part located centrally relative to the fork arm. However, it is also possible to associate an eccentric screw-on part with a fork arm for example to provide this screw-on part on the left or right. In this manner, the respective spatial and mounting conditions can be adapted.

A container is located at 27. This container can be designed as a one-piece replaceable module or board and comprises limit switches, microswitches, or inductive switches or pneumatic switches to interrogate the respective position of the piston as well as the position of clamping arm 6.

Reference numeral 28 refers to a manual lever that can be used on both sides of the device, said lever having a handle 29. In FIG. 2, dot-dashed lines show the alternative mounting arrangement for this manual lever 28. This manual lever 28 has a coupling 30 by means of which manual lever 28 is mountable on a pivot axis 31 that is mounted pivotably movably in housing parts 7 and 8. For this purpose, housing parts 7 and 8 have bores arranged coaxially with respect to one another, from which pivot axis 31 projects at both ends to a degree such that coupling 30 of manual lever 28 can be pushed on. In this end area, pivot axis 31 is provided with suitable shapes, for example, a square or hexagon, onto which coupling 30 with a suitable matching recess (not shown) can be placed in order to create a positive connection.

In addition, pivot axis 31 is brought out suitably sealed in the bores of housing parts 7 and 8 for example by gaskets not shown in order to achieve the required tightness against dirt and dust and also possibly to create a liquid-type encapsulation.

An articulated lever 32 is mounted integrally in the central lengthwise area of pivot axis 31, said lever being designed approximately in the shape of an S in the top view shown in FIG. 1 and being composed of two lengthwise sections which, in the embodiment shown, have their lengthwise axes running at right angles to one another. One lengthwise section 33, the one with the greater length, is connected integrally with pivot axis 31, while the other lengthwise section 34 has a driver 35 in the shape of a sphere at its end in the embodiment shown, said driver being mounted in a connecting link 30 so that it can slide and pivot as well as roll. This connecting link 36 is formed in the embodiment shown by a bore that has its lengthwise axis 37 running orthogonally to lengthwise axis 38 of piston rod 3, in which bore rigid driver 35 is located so that it is slidably displaceable and can roll, and fits with the required play. Driver 35 is made rigid and connected integrally with lengthwise section 34. Both pivot axis 31 and lengthwise sections 33 and 34 as well as driver 35 can be made of a metallic material, especially steel. Driver 35 has the necessary surface quality to permit easy movement in connecting rod 36. As shown in FIG. 1, connecting rod 36 is connected likewise integrally material-wise by a thickening in piston rod 3, in which thickening connecting link 36 is formed as a bore.

In addition, a slot 39 that runs symmetrically to lengthwise axis 38 of piston rod 3 terminates in connecting link 36, in which slot articulated lever 32 can pivot with its lengthwise sections 33 and 34 in a positive manner, but with play, when piston rod 3 is displaced in the direction of lengthwise axes A and B (FIG. 1). For this purpose, articulated lever 32 is made rectangular, i.e. plate-shaped, in cross section. For example, if a cross section is made orthogonally to the lengthwise axis of lengthwise section 33, it will be flat and rectangular. This is also true for lengthwise section 34 in a cross section made orthogonally to its lengthwise axis.

Both cross sections of lengthwise sections 33 and 34 have the same shape, so that lengthwise sections 33 and 34 merge smoothly with one another and are flush on both sides.

The manual adjustment of clamping arm 6 is performed using manual lever 28 in which the latter can be pivoted up and down in the required manner, in other words, in directions X and Y. As a result, pivot axis 31 is also rotated around its lengthwise axis, with articulated lever 32 connected integrally therewith being entrained and moving piston rod 3 in direction A or B through driver 35. Driver 35 slides only orthogonally with respect to lengthwise axis 38 of piston rod 3, in other words back and forth in connecting link 36. Articulated lever 32 then penetrates to a greater or lesser degree into slot 39.

The control means such as multipath valves, etc. that serve to supply pressure medium to one side or the other of the piston are not shown for reasons of simplification but can also conform to conventional designs.

The features described in the claims and in the specification and visible from the drawing can be important both individually and in any desired combinations for working the invention.

REFERENCE NUMBERS IN DRAWINGS

1 clamping head
2 cylinder
3 piston rod
4 lid
5 toggle lever arrangement
6 clamping arm
7 housing part, shell-shaped
8 housing part, shell-shaped
9 parting plane
10 partition
11 partition
12 recess, semicircular
13 recess, semicircular
14 chamber
15 bore
16 bore
17 pivot pin
18 guide groove
19 guide groove
20 bore
21 bore
22 fork arm
23 end section
24 end section
25 retaining tab
26 retaining tab
27 container
28 manual lever
29 handle
30 coupling
31 pivot axis
32 articulated lever
33 lengthwise section, lever part
34 lengthwise section, lever part
35 driver, sphere, crown, bead
36 connecting link, bore
37 lengthwise axis
38 lengthwise axis
39 slot
40 midline
A direction of movement of piston rod, lengthwise axis direction
B direction of movement of piston rod, lengthwise axis direction
x pivot direction of clamping arm 6
y pivot direction of clamping arm 6

What is claimed is:

1. A toggle lever clamp, comprising:

a clamping head, having a housing, a cylinder abutting said clamping head as an extension thereof, in an axial direction, with a piston, alternately pressurized on either side by the pressure of a pressure fluid medium, provided in said cylinder, said piston being guided displaceably lengthwise in the axial direction and in a sealing manner, said piston being connected to a piston rod which moves with said piston, the piston rod having a free end opposite an end thereof connected to the piston, a toggle joint arrangement mounted at the free end of the piston rod, inside the clamping head, said toggle joint arrangement having a clamping arm associated therewith, a manual lever that is manually operable and engages the piston rod, a handle associated with said manual lever, the manual lever cooperating with the piston rod through a joint for axial movement of the piston rod, the clamping head consisting of two housing parts that are shell-shaped and integral material-wise, said two housing parts encapsulating the toggle joint arrangement and a portion of the piston rod to protect the toggle joint arrangement and the piston rod from dust, dirt, and spray entering from outside the clamping head, wherein guide grooves for the toggle joint arrangement and through bores for a pivot pin of the toggle joint arrangement and optionally at least one opening or recess for a housing for microswitches or for inductive switches or for pneumatic switches are provided in inner walls of the shell-shaped housing parts, and the manual lever is mounted on a pivot axis associated with the clamping head, and the pivot axis is connected by an articulated lever with a driver, said driver being guided and held directly in a connecting link of the piston rod.

2. The toggle lever clamp according to claim 1, wherein the connecting link of the piston rod for the driver extends transversely with respect to said axial direction.

3. The toggle lever clamp according to claim 2, wherein the connecting link extends rectilinearly and orthogonally with respect to said axial direction.

4. The toggle lever clamp according to claim 1, wherein the driver is guided slidably and pivotably in the connecting link of piston rod.

5. The toggle lever clamp according to claim 1, wherein the connecting link is designed as a bore and said driver is designed with a crown or bead.

6. The toggle lever clamp according to claim 1, wherein said driver is designed as a universal ball joint.

7. The toggle lever clamp according to claim 1, wherein said driver is a partial sphere.

8. The toggle lever clamp according to claim 1, wherein said driver is a sphere.

9. The toggle lever clamp according to claim 1, wherein a slot is provided in the central area of the connecting link, said slot extending in the axial direction of piston rod to a limited extent, into which slot the articulated lever enters wholly or partially in different ways as the piston rod is displaced.

10. The toggle lever clamp according to claim 1, wherein the articulated lever is connected integrally and rigidly with pivot axis and driver.

11. The toggle lever clamp according to claim 1, wherein the articulated lever includes two lever parts that move at an angle to one another and are designed respectively as two lengthwise sections, with one of the lengthwise sections being connected with the driver and the other of the lengthwise sections being connected at an end thereof with the pivot axis.

12. The toggle lever clamp according to claim 11, wherein one of the two lever parts runs parallel to the axial direction and the other of the two lever parts runs orthogonally or approximately orthogonally to the axial direction in the clamping position or approximately in the clamping position.

13. The toggle lever clamp according to claim 11, wherein the articulated lever is made plate-shaped and engages a lengthwise slot of the piston rod with play, with the lengthwise slot terminating orthogonally in the connecting link, and a lengthwise axis of the articulated lever extends orthogonally with respect to a lengthwise axis of the pivot axis for the manual lever.

14. The toggle lever clamp according to claim 1, wherein the driver, as the clamping arm pivots back and forth, performs a movement directed transversely and orthogonally with respect to the axial direction, while the articulated lever pivots in a plane that is directed parallel or approximately parallel to the axial direction.

15. The toggle lever clamp according to claim 1, wherein the pivot pin of the toggle joint arrangement has at each end at least one guide roller, and each guide roller is rollably located respectively in one of the guide grooves of the shell-shaped housing parts.

16. A toggle lever clamp, especially for use in devices and welding machines for auto body construction in the motor vehicle industry, comprising:

a clamping head, having a housing;

a cylinder abutting said clamping head as an extension thereof, in an axial direction, with a piston, alternately pressurized on either side by the pressure of a pressure fluid medium, provided in said cylinder, said piston being guided displaceably lengthwise in the axial direction and in a sealing manner, said piston being connected to a piston rod which moves with said piston, the piston rod having a free end opposite an end thereof connected to the piston;

a toggle joint arrangement mounted at the free end of the piston rod, inside the clamping head, said toggle joint arrangement having a clamping arm associated therewith; and a manual lever that is manually operable and engages the piston rod, and a handle associated with said manual lever, the manual lever cooperating with the piston rod through a joint for axial movement of the piston rod, wherein the clamping head consists of two housing parts that are shell-shaped and integral material-wise, said two housing parts encapsulating the toggle joint arrangement and a portion of the piston rod to protect the toggle joint arrangement and the piston rod from dust, dirt, and spray entering from outside the clamping head, wherein guide grooves for the toggle joint arrangement and through bores for a pivot pin of the toggle joint arrangement and optionally at least one opening or recess for a housing for microswitches or for inductive switches or for pneumatic switches are provided in inner walls of the shell-shaped housing parts, wherein the manual lever is mounted on a pivot axis associated with the clamping head, and the pivot axis is connected by an articulated lever with a driver, said driver being guided and held directly in a connecting link of the piston rod, and wherein the articulated lever consists of two lever parts that move at an angle to one another and are designed respectively as two lengthwise sections, with one of the two lengthwise sections being connected at an end thereof with the pivot axis, the articulated lever having two ends and being designed to be approximately S-shaped in a side view, and with the pivot axis being provided at one end of the articulated lever and the driver being provided at the other end of the articulated lever.

17. A toggle lever clamp, comprising:

a clamping head, having a housing;

a cylinder abutting said clamping head as an extension thereof, in an axial direction, with a piston, alternately pressurized on either side by the pressure of a pressure fluid medium, provided in said cylinder, said piston being guided displaceably lengthwise in the axial direction and in a sealing manner, said piston being connected to a piston rod which moves with said piston, the piston rod having a free end opposite an end thereof connected to the piston;

a toggle joint arrangement mounted at the free end of the piston rod, inside the clamping head, said toggle joint arrangement having a clamping arm associated therewith; and a manual lever that is manually operable and engages the piston rod, and a handle associated with said manual lever, the manual lever cooperating with the piston rod through a joint, for axial movement of the piston rod, wherein the clamping head includes two housing parts that are shell-shaped, said two housing parts substantially encapsulating the toggle joint arrangement and a portion of the piston rod to protect the toggle joint arrangement and the piston rod from dust, dirt, and spray entering from the outside.

18. The toggle lever clamp according to claim 17, wherein inner walls of the shell-shaped housing parts include guide grooves for the toggle joint arrangement and through bores for a pivot pin of the toggle joint arrangement, and wherein said inner walls optionally include at least one opening or recess for a housing for microswitches or for inductive switches or for pneumatic switches.

19. A toggle lever clamp, comprising:

a clamping head, having a housing;

a cylinder abutting said clamping head as an extension thereof, in an axial direction, with a piston, alternately pressurized on either side by the pressure of a pressure fluid medium, provided in said cylinder, said piston being guided displaceably lengthwise in the axial direction and in a sealing manner, said piston being connected to a piston rod which moves with said piston, the piston rod having a free end opposite an end thereof connected to the piston;

a toggle joint arrangement being mounted at the free end of the piston rod, inside the clamping head, said toggle joint arrangement having a clamping arm associated therewith; and a manual lever that is manually operable and engages the piston rod, with a handle associated with said manual lever, the manual lever cooperating with the piston rod through a joint for axial movement of the piston rod, wherein the manual lever is mounted on a pivot axis associated with the clamping head, and the pivot axis is connected by an articulated lever with a driver, said driver being guided and held directly in a connecting link of the piston rod.

* * * * *